(12) United States Patent
Doi

(10) Patent No.: US 11,162,560 B2
(45) Date of Patent: Nov. 2, 2021

(54) BELT-TYPE TRANSMISSION

(71) Applicant: BANDO CHEMICAL INDUSTRIES, LTD., Kobe (JP)

(72) Inventor: Ikuhito Doi, Kobe (JP)

(73) Assignee: BANDO CHEMICAL INDUSTRIES, LTD., Kobe (JP)

( * ) Notice: Subject to any disclaimer, the term of this patent is extended or adjusted under 35 U.S.C. 154(b) by 292 days.

(21) Appl. No.: 16/591,517

(22) Filed: Oct. 2, 2019

(65) Prior Publication Data
US 2020/0109766 A1 Apr. 9, 2020

(30) Foreign Application Priority Data
Oct. 3, 2018 (JP) .............................. JP2018-188249

(51) Int. Cl.
*F16G 5/20* (2006.01)
*F16H 7/02* (2006.01)
*F16G 5/08* (2006.01)

(52) U.S. Cl.
CPC ................. *F16G 5/20* (2013.01); *F16G 5/08* (2013.01); *F16H 7/023* (2013.01)

(58) Field of Classification Search
CPC ........... F16H 9/125; F16H 55/56; F16H 55/38
USPC ............................................................ 474/8
See application file for complete search history.

(56) References Cited

U.S. PATENT DOCUMENTS

| | | | | |
|---|---|---|---|---|
| 3,016,755 A | * | 1/1962 | Dittrich ..................... | F16G 5/18 474/8 |
| 3,604,283 A | * | 9/1971 | Van Doorne ............. | F16H 9/12 474/8 |
| 4,276,041 A | * | 6/1981 | Steuer ....................... | F16H 9/24 474/243 |
| 4,631,042 A | * | 12/1986 | Rattunde ................... | F16H 9/24 474/242 |
| 4,698,050 A | * | 10/1987 | Hattori ...................... | F16G 5/16 474/201 |
| 4,790,799 A | * | 12/1988 | Sadler ....................... | F16G 3/02 474/201 |
| 4,795,406 A | * | 1/1989 | Dittrich .................... | F16G 5/18 474/201 |
| 4,915,677 A | * | 4/1990 | Simon ....................... | F16G 5/16 474/242 |
| 5,004,450 A | * | 4/1991 | Ide ............................ | F16G 5/16 474/242 |
| 5,328,412 A | * | 7/1994 | Durum ..................... | F16H 9/125 474/242 |

(Continued)

FOREIGN PATENT DOCUMENTS

| | | |
|---|---|---|
| JP | H08-326859 A | 12/1996 |
| JP | 2004-270708 A | 9/2004 |

*Primary Examiner* — Henry Y Liu
(74) *Attorney, Agent, or Firm* — Maschoff Brennan

(57) ABSTRACT

A belt-type transmission includes a drive pulley, a driven pulley, and a V-belt. In at least a certain range of a low-speed layout, a pulley-groove V angle of a portion of a drive pulley where the V-belt is wrapped is larger than an average belt V angle when the V-belt is bent at a curvature corresponding to a wrapping diameter of the V-belt with respect to the drive pulley, and a pulley-groove V angle of a portion of a driven pulley where the V-belt is wrapped is larger than an average belt V angle when the V-belt is bent at a curvature corresponding to the wrapping diameter of the V-belt with respect to the driven pulley.

16 Claims, 12 Drawing Sheets

(56) References Cited

U.S. PATENT DOCUMENTS

| | | | | |
|---|---|---|---|---|
| 5,685,793 A * | 11/1997 | Van Blaricom | F16G 5/00 | 474/33 |
| 5,792,013 A * | 8/1998 | Heinrich | F16H 9/24 | 474/242 |
| 5,897,450 A * | 4/1999 | May | F16H 55/56 | 474/32 |
| 6,206,796 B1 * | 3/2001 | Lee | F16H 9/20 | 474/84 |
| 6,293,887 B1 * | 9/2001 | Linnenbrugger | F16G 5/18 | 474/18 |
| 6,416,433 B1 * | 7/2002 | Linnenbrugger | F16H 9/125 | 474/242 |
| 6,440,024 B1 * | 8/2002 | Kobayashi | F16G 5/16 | 474/242 |
| 6,926,631 B2 * | 8/2005 | Brandsma | F16G 5/16 | 474/17 |
| 7,037,225 B2 * | 5/2006 | Takagi | F16H 9/125 | 474/8 |
| 7,431,674 B2 * | 10/2008 | Van Der Leest | F16H 9/125 | 474/148 |
| 8,100,789 B2 * | 1/2012 | Morgan, Jr. | F16H 55/56 | 474/8 |
| 8,491,426 B2 * | 7/2013 | Van Der Leest | F16H 9/125 | 474/8 |
| 8,647,223 B2 * | 2/2014 | Kuwabara | F16G 5/16 | 474/242 |
| 8,863,368 B2 * | 10/2014 | Yasuhara | G01M 13/023 | 29/446 |
| 9,279,475 B2 * | 3/2016 | Sumida | F16G 5/16 | |
| 10,955,028 B2 * | 3/2021 | Morino | F16G 5/16 | |
| 2002/0151399 A1 * | 10/2002 | Mott | F16G 5/16 | 474/242 |
| 2003/0144097 A1 * | 7/2003 | Brandsma | F16G 5/16 | 474/8 |
| 2006/0058125 A1 * | 3/2006 | Van Der Leest | F16H 9/125 | 474/8 |
| 2009/0082148 A1 * | 3/2009 | Van Der Leest | F16H 9/125 | 474/166 |
| 2010/0071191 A1 * | 3/2010 | Yasuhara | G01L 5/04 | 29/446 |
| 2011/0098144 A1 * | 4/2011 | Van Der Leest | F16H 9/125 | 474/8 |
| 2016/0319917 A1 * | 11/2016 | Van Der Meer | F16H 9/18 | |

* cited by examiner

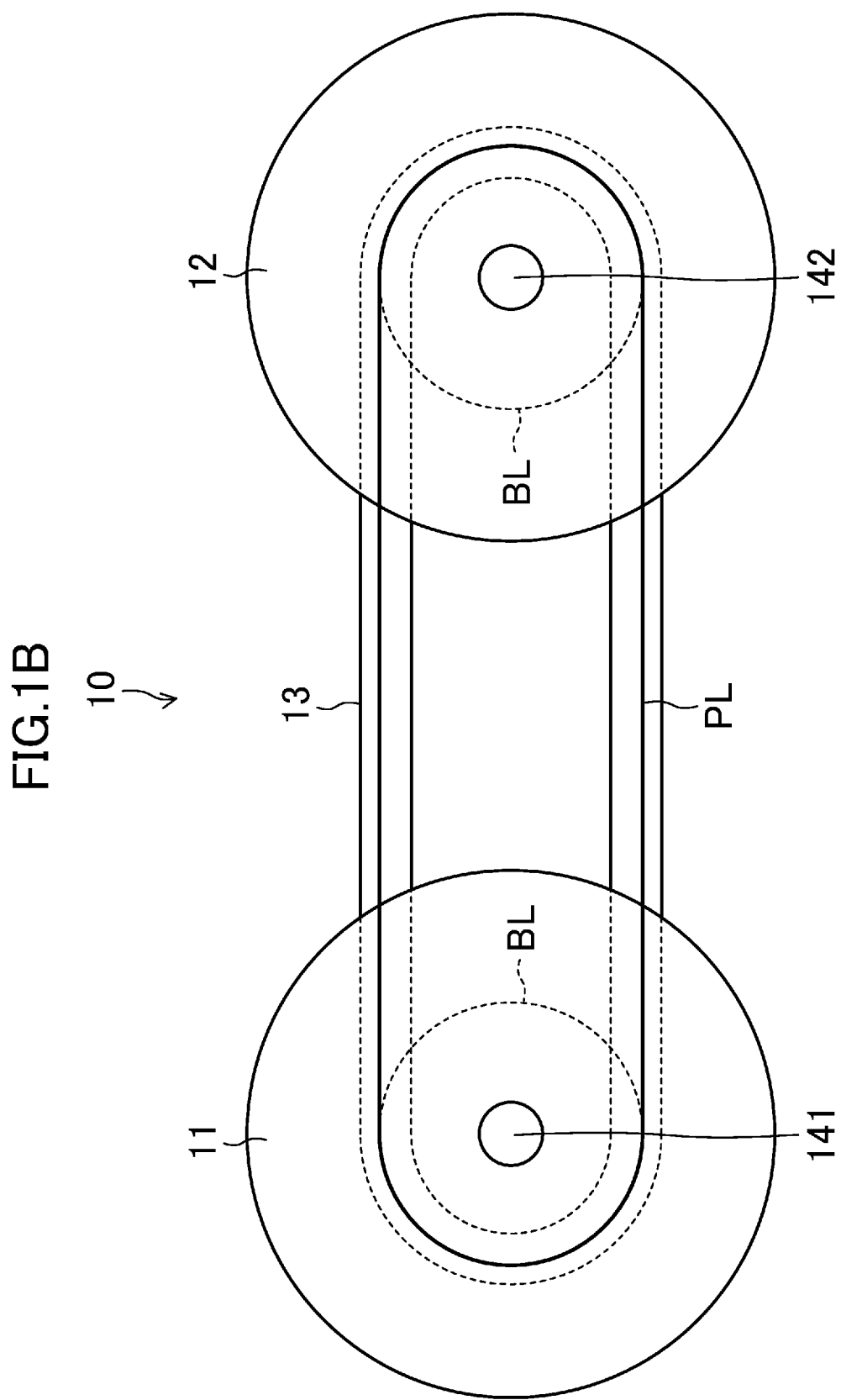

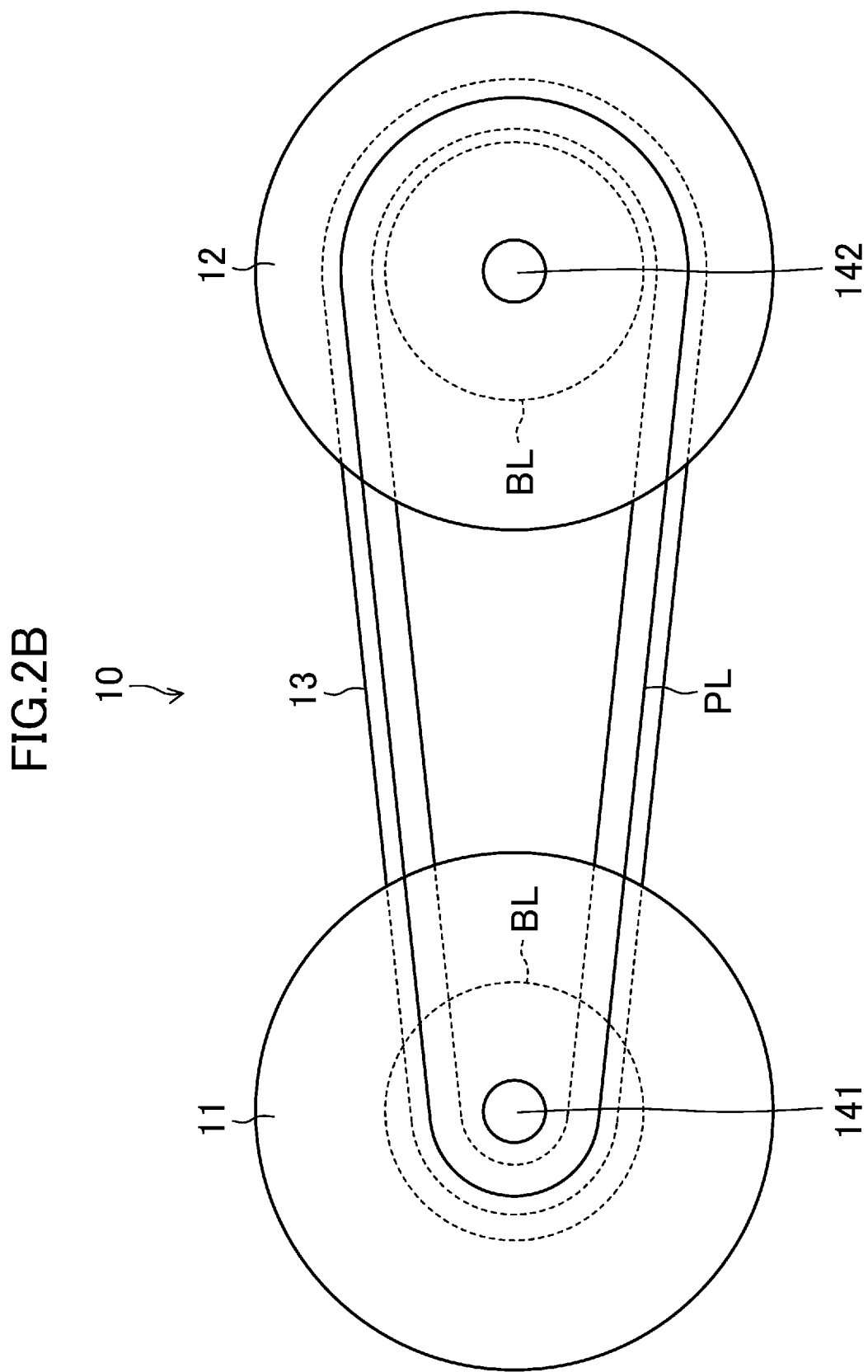

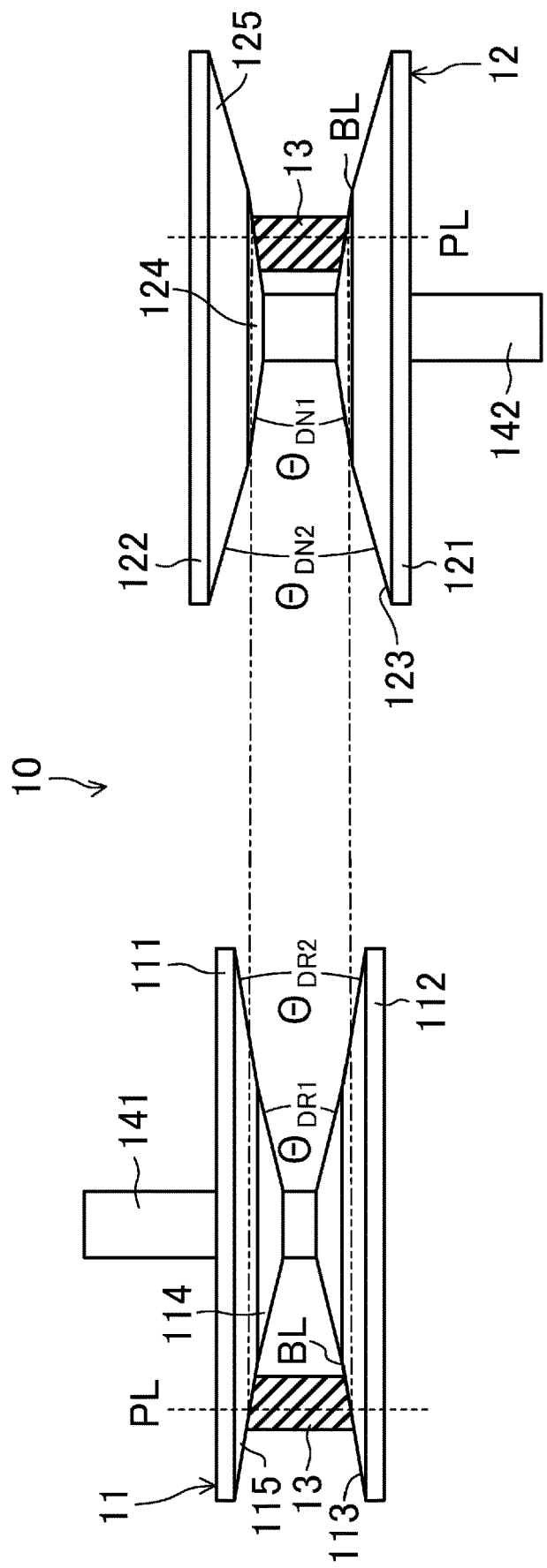

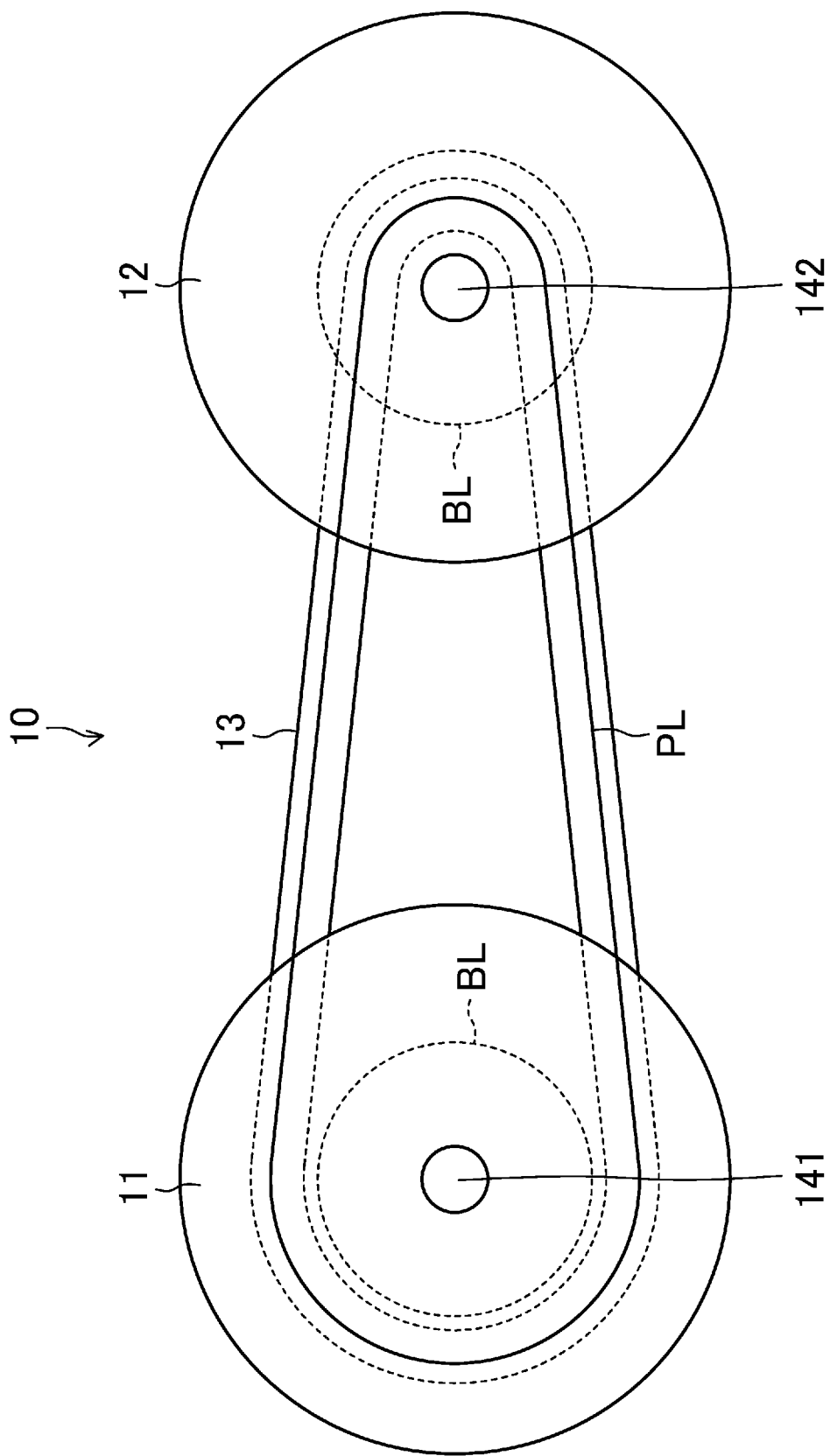

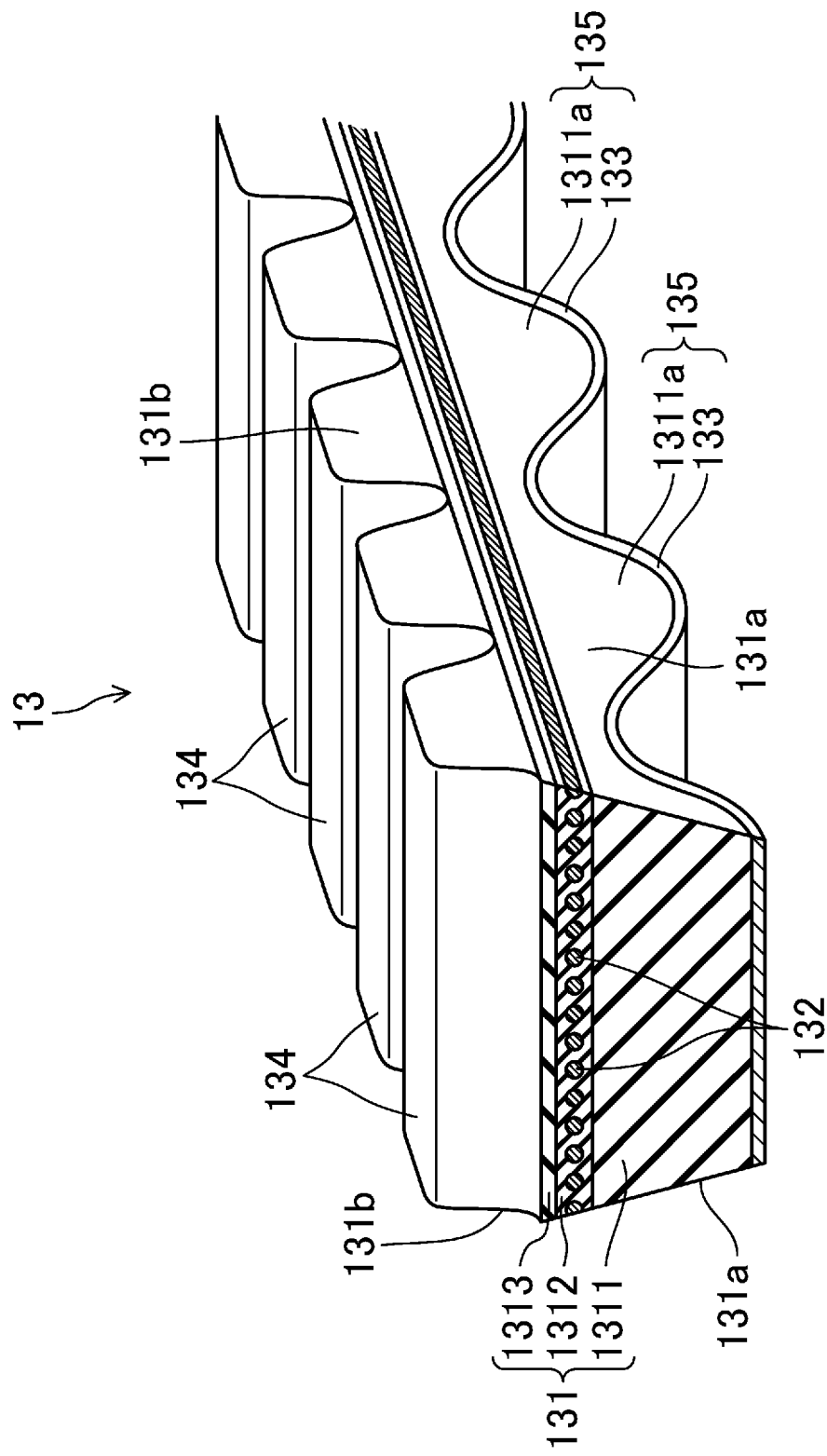

BELT-TYPE TRANSMISSION

CROSS-REFERENCE TO RELATED APPLICATION

This application claims priority to Japanese Patent Application No. 2018-188249 filed on Oct. 3, 2018, the entire disclosure of which is incorporated by reference herein.

BACKGROUND

There has been known a belt-type transmission having the following constitution. A V-belt is extended between and wrapped around a drive pulley and a driven pulley, and the speed of the belt-type transmission can be changed by changing a wrapping diameter of the V-belt with respect to the drive pulley and to the driven pulley. As to such a belt-type transmission, Japanese Unexamined Patent Application No. 2004-270708 discloses the constitution where the respective pulley-groove V angles of a drive pulley and a driven pulley are made smaller than a belt V angle of a V-belt. Furthermore, Japanese Unexamined Patent Application No. H08-326859 discloses a belt-type transmission where a pulley-groove V angle of an inner peripheral portion of a drive pulley and a pulley-groove V angle of an outer peripheral portion of a driven pulley are set smaller than the belt V angle of a V-belt and, at the same time, a pulley-groove V angle of an outer peripheral portion of the drive pulley and a pulley-groove V angle of an inner peripheral portion of the driven pulley are set equal to the belt V angle of the V-belt.

SUMMARY

A belt-type transmission according to the present technique includes a drive pulley, a driven pulley, and a V-belt wrapped around the drive pulley and the driven pulley, the belt-type transmission being capable of changing the wrapping diameter of the V-belt with respect to the drive pulley and the driven pulley, wherein in at least a certain range of a low-speed layout where the wrapping diameter of the V-belt with respect to the drive pulley is smaller than the wrapping diameter of the V-belt with respect to the driven pulley, the pulley-groove V angle of a portion of the drive pulley where the V-belt is wrapped is larger than an average belt V angle when the V-belt is bent at a curvature corresponding to the wrapping diameter of the V-belt with respect to the drive pulley, and the pulley-groove V angle of a portion of the driven pulley where the V-belt is wrapped is larger than an average belt V angle when the V-belt is bent at a curvature corresponding to the wrapping diameter of the V-belt with respect to the driven pulley.

BRIEF DESCRIPTION OF DRAWINGS

FIG. 1B is a side view illustrating the medium-speed layout of the belt type transmission according to the embodiment;

FIG. 2B is a side view illustrating the low-speed layout of the belt-type transmission according to the embodiment;

FIG. 3A is a plan view illustrating a high-speed layout of the belt-type transmission according to the embodiment;

FIG. 3B is a side view illustrating the high-speed layout of the belt-type transmission according to the embodiment;

FIG. 4A is a perspective view of a piece of a double cogged V-belt;

DETAILED DESCRIPTION

Figure 1A:
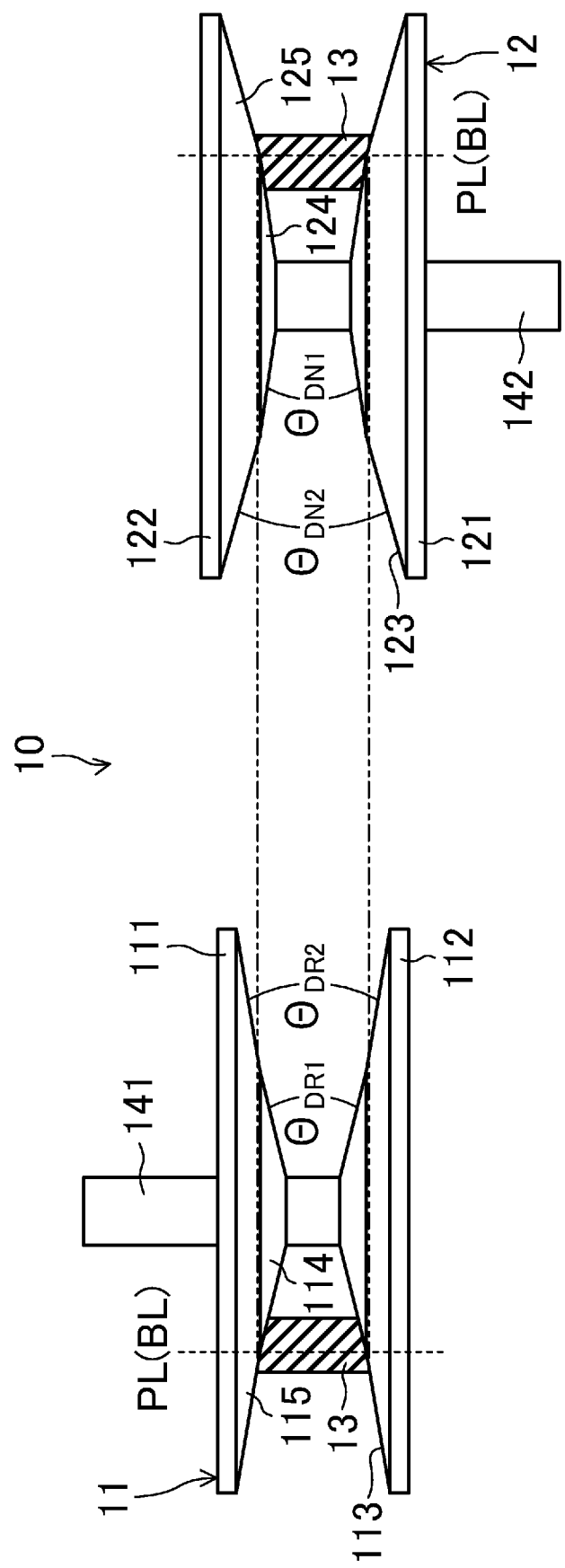
FIG. 1A is a plan view illustrating a medium-speed layout of a belt-type transmission according to an embodiment.

An embodiment will be described in detail below.

FIG. 1A, FIG. 1B, FIG. 2A, FIG. 2B, FIG. 3A, and FIG. 3B illustrate a belt-type transmission 10 according to the embodiment. The belt-type transmission 10 according to the embodiment is, for example, used as a continuously variable transmission for a two-wheeled vehicle or a general purpose machine.

The belt-type transmission 10 according to the embodiment includes a drive pulley 11, a driven pulley 12, and a double cogged V-belt 13 extended between and wrapped around the drive pulley 11 and the driven pulley 12.

The drive pulley 11 and the driven pulley 12 are arranged on a drive shaft 141 and a driven shaft 142 that are arranged in parallel with each other, respectively.

The drive pulley 11 has a fixed sheave 111 fixed to the drive shaft 141, and a movable sheave 112 arranged on the drive shaft 141 in a movable manner in the axial direction of the drive shaft 141, and the fixed sheaves 111 and the movable sheave 112 constitute a pulley groove 113 formed in a V-shape therebetween. The drive pulley 11 is constituted so that the movable sheave 112 is moved to change the distance between the movable sheave 112 and the fixed sheave 111 thus changing the wrapping diameter of the double cogged V-belt 13 with respect to the drive pulley 11, the double cogged V-belt 13 being fitted in the pulley groove 113.

That is, when the movable sheave 112 is moved in the direction away from the fixed sheave 111, and a distance between the movable sheave 112 and the fixed sheave 111 becomes large, the double cogged V-belt 13 is shifted to the inner periphery side of the pulley groove 113 in the pulley groove 113 and hence, the wrapping diameter of the double cogged V-belt 13 with respect to the drive pulley 11 becomes small. On the other hand, when the movable sheave 112 is moved in the direction toward the fixed sheave 111, and a distance between the movable sheave 112 and the fixed sheave 111 becomes small, the double cogged V-belt 13 is shifted to the outer periphery side of the pulley groove 113 in the pulley groove 113 and hence, the wrapping diameter of the double cogged V-belt 13 with respect to the drive pulley 11 becomes large. Furthermore, in the drive pulley 11, a pulley-groove V angle $\Theta_{DR1}$ is made relatively large in an inner peripheral portion 114, and a pulley-groove V angle $\Theta_{DR2}$ is made relatively small in an outer peripheral portion 115 extending continuously from the inner peripheral portion 114. The pulley-groove V angle $\Theta_{DR1}$ of the inner peripheral portion 114 of the drive pulley 11 is, for example, in the range from 26.5° to 38.5°. The pulley-groove V angle $\Theta_{DR2}$ of the outer peripheral portion 115 of the drive pulley 11 is, for example, in the range from 26.0° to 38.0°.

The driven pulley 12 has a fixed sheave 121 fixed to the driven shaft 142, and a movable sheave 122 arranged on the driven shaft 142 in a movable manner in the axial direction of the driven shaft 142, and the fixed sheave 121 and the movable sheave 122 constitute a pulley groove 123 formed in a V-shape therebetween. The driven pulley 12 is constituted so that the movable sheave 122 is moved to change the distance between the movable sheave 122 and the fixed sheave 121 thus changing the wrapping diameter of the double cogged V-belt 13 with respect to the driven pulley 12, the double cogged V-belt 13 being fitted in the pulley groove 123.

That is, when the movable sheave 122 is moved in the direction away from the fixed sheave 121, and a distance between the movable sheave 122 and the fixed sheave 121 becomes large, the double cogged V-belt 13 is shifted to the inner periphery side of the pulley groove 123 in the pulley groove 123 and hence, the wrapping diameter of the double cogged V-belt 13 with respect to the driven pulley 12 becomes small. On the other hand, when the movable sheave 122 is moved in the direction toward the fixed sheave 121, and a distance between the movable sheave 122 and the fixed sheave 121 becomes small, the double cogged V-belt 13 is shifted to the outer periphery side of the pulley groove 123 in the pulley groove 123 and hence, the wrapping diameter of the double cogged V-belt 13 with respect to the driven pulley 12 becomes large. Furthermore, in the driven pulley 12, a pulley-groove V angle $\Theta_{DN1}$ is made relatively small in an inner peripheral portion 124, and a pulley-groove V angle $\Theta_{DN2}$ is made relatively large in an outer peripheral portion 125 extending continuously from the inner peripheral portion 124. The pulley-groove V angle $\Theta_{DN1}$ of the inner peripheral portion 124 of the driven pulley 12 is, for example, in the range from 26.0° to 38.0°. In terms of obtaining excellent durability of the double cogged V-belt 13, it is suitable to set the pulley-groove V angle $\Theta_{DN1}$ equal to or smaller than the pulley-groove V angle $\Theta_{DR2}$ of the outer peripheral portion 115 of the drive pulley 11. The pulley-groove V angle $\Theta_{DN2}$ of the outer peripheral portion 125 of the driven pulley 12 is, for example, in the range from 29.5° to 41.5°. In terms of obtaining excellent durability of the double cogged V-belt 13, it is suitable to set the pulley-groove V angle $\Theta_{DN2}$ equal to or larger than the pulley-groove V angle $\Theta_{DR1}$ of the inner peripheral portion 114 of the drive pulley 11.

Figure 4B:
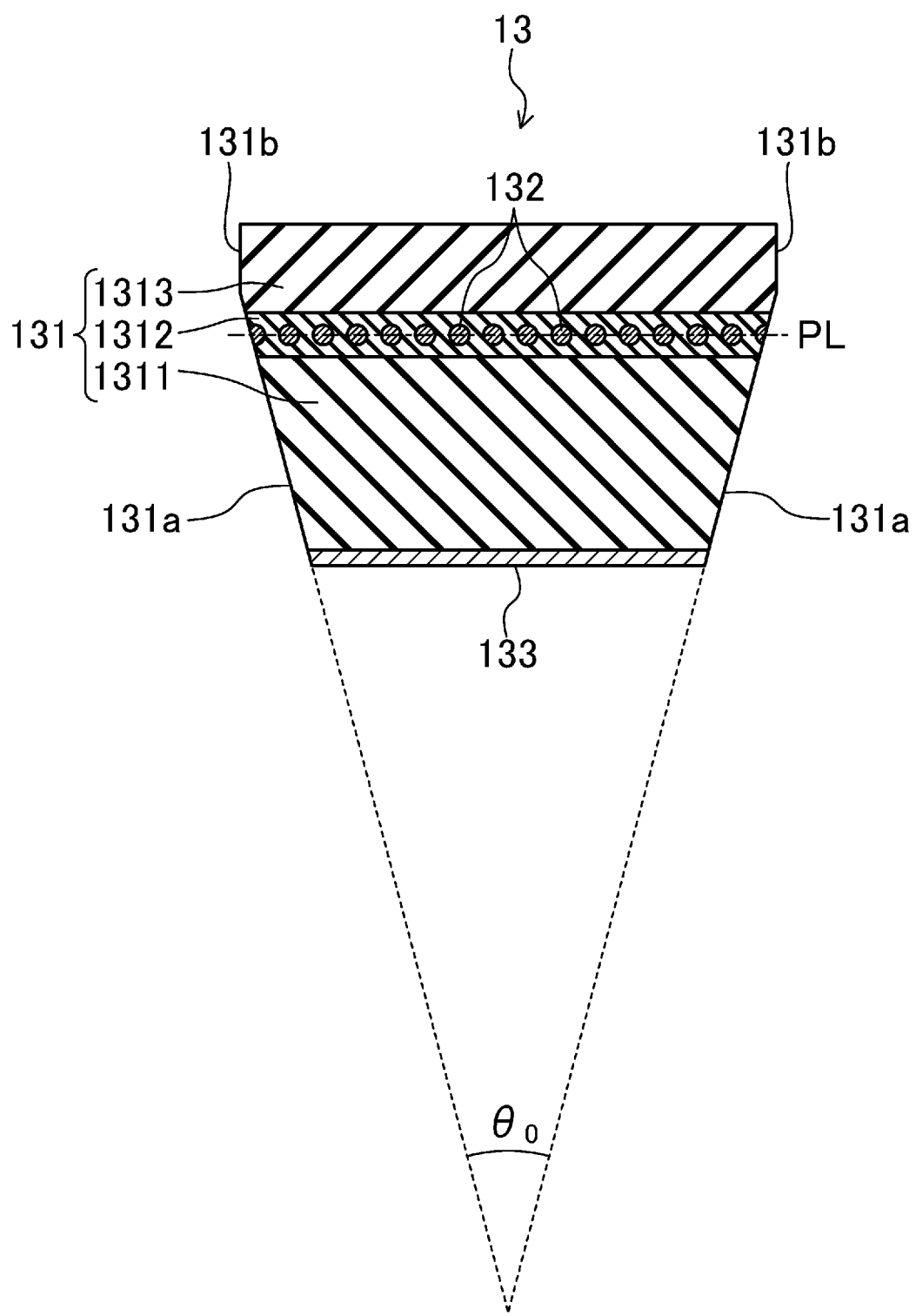
FIG. 4B is a cross-sectional view of the double cogged V-belt.

FIG. 4A and FIG. 4B illustrate the double cogged V-belt 13. The double cogged V-belt 13 includes a V-belt body 131 made of rubber, a cord 132, and a reinforcing cloth 133.

The V-belt body 131 is formed in such a shape that an isosceles trapezoid part located on the inner periphery side of the V-belt body 131 and a laterally long rectangular part located on the outer periphery side of the V-belt body 131 are laminated with each other as viewed in a cross sectional view taken along the belt width direction. Each of both side faces of the V-belt body 131 is constituted of an inclined face 131a that corresponds to the oblique side of the cross-sectional shape of the isosceles trapezoid part and extends in the direction inclined inwardly with respect to the belt thickness direction, and a vertical face 131b that corresponds to the shorter side of the cross-sectional shape of the laterally long rectangular part and extends in the belt thickness direction. Each of the respective inclined faces 131a located on both sides of the V-belt body 131 constitutes a pulley contact face to be brought into contact with the drive pulley 11 and the driven pulley 12. In a state that the double cogged V-belt 13 extends straightly, an average belt V angle $\theta_0$ formed by the inclined faces 131a is, for example, in the range from 24° to 36°. Here, the "average belt V angle" in the present application is explained as follows; that is, in a cross section of a V-belt in a state that the V-belt is extended straightly when the V-belt is not wrapped around a pulley, or in a state that the V-belt is bent at a predetermined curvature, an angle formed by both inclined faces each of which is approximated linearly with a least squares method is referred to as the "average belt V angle."

The V-belt body 131 is constituted of a compression rubber layer 1311 located on the inner periphery side thereof, an adhesive rubber layer 1312 located in the intermediate portion thereof, and an extension rubber layer 1313 located on the outer periphery side thereof. As for the respective thicknesses of these layers, the compression rubber layer 1311 has a largest thickness, the adhesive rubber layer 1312 has a smallest thickness, and the extension rubber layers 1313 has a medium thickness between them. Each of the compression rubber layer 1311, the adhesive rubber layer 1312, and the extension rubber layer 1313 is composed of a rubber composition cross-linked by heating and pressurizing an uncross-linked rubber composition obtained by blending and kneading a rubber component such as a chloroprene rubber (CR) with various compound ingredients such as a cross linking agent.

The compression rubber layer 1311 is provided with lower cog formation parts 1311a on the inner periphery thereof at fixed intervals, the lower cog formation parts 1311a each being formed in a sign curve shape as viewed in a cross-sectional view along the belt length direction. The extension rubber layer 1313 is provided with upper cogs 134 on the outer periphery thereof at fixed intervals, the upper cogs 134 each being formed in a rectangular shape as viewed in the cross-sectional view along the belt length direction. Each of the inclined faces 131a that constitute respective side faces of the V-belt body 131 is constituted of respective side faces of the compression rubber layer 1311, the adhesive rubber layer 1312, and a part of the extension rubber layer 1313 that is located on the inner periphery side thereof. Consequently, each of the inclined faces 131a that constitute the respective pulley contact faces is mainly constituted of the side face of the compression rubber layer 1311. The vertical face 131b is constituted of the side face of the remaining part of the extension rubber layer 1313, and the dimension of the vertical face 131b in the thickness direction is equal to the height of the upper cog 134.

The cord 132 is embedded in the middle portion in the belt thickness direction of the adhesive rubber layer 1312 of the V-belt body 131, in such a manner that the cord 132 forms a helical pattern having a pitch in the belt width direction. The cord 132 is, for example, composed of a twisted thread made of polyester fibers. It is suitable to apply, to the cord 132, an adhesion treatment for imparting an adhesive property with respect to the adhesive rubber layer 1312. In the present application, the wrapping diameter of the double cogged V-belt 13 with respect to the drive pulley 11 or the driven pulley 12 is twice the bend radius of the double cogged V-belt 13 at the center position PL of the cord 132 in the belt thickness direction of the double cogged V-belt 13.

The reinforcing cloth 133 covers the inner peripheral face of the compression rubber layer 1311 of the V-belt body 131. The reinforcing cloth 133 covers the lower cog formation parts 1311a of the compression rubber layer 1311 thus forming lower cogs 135 arranged on the inner periphery side of the double cogged V-belt 13 at fixed intervals. The reinforcing cloth 133 is, for example, composed of a woven fabric made of aliphatic polyamide fibers. It is suitable to apply, to the reinforcing cloth 133, an adhesion treatment for imparting an adhesive property with respect to the compression rubber layer 1311.

The belt-type transmission 10 according to the embodiment is constituted such that the double cogged V-belt 13 is extended between and wrapped around the drive pulley 11 and the driven pulley 12, and when the drive shaft 141 is rotated by a power source such as an engine, the drive pulley 11 is also rotated to travel the double cogged V-belt 13 thus rotating the driven shaft 142 simultaneously with the driven pulley 12 and transmitting the power of the power source.

Furthermore, the belt-type transmission 10 according to the embodiment is constituted such that the movable sheave 112 of the drive pulley 11 and the movable sheave 122 of the driven pulley 12 are connected with each other by way of an interlocking mechanism (not illustrated in the drawings), and when the movable sheave 112 of the drive pulley 11 and the movable sheave 122 of the driven pulley 12 are interlocked with each other and moved by the interlocking mechanism while the double cogged V-belt 13 is travelling, the respective wrapping diameters of the double cogged V-belt 13 with respect to the drive pulley 11 and the driven pulley 12 are changed thus controlling and changing the rotational speed of the driven shaft 142.

In the belt-type transmission 10 according to the embodiment, as illustrated in FIG. 1A and FIG. 1B, in a medium-speed layout such that the wrapping diameter of the double cogged V-belt 13 with respect to the drive pulley 11 and the wrapping diameter of the double cogged V-belt 13 with respect to the driven pulley 12 are identical with each other, the center position PL of the cord 132 in the belt thickness direction of the double cogged V-belt 13 is located on a boundary BL between the inner peripheral portion 114 and the outer peripheral portion 115 where the pulley-groove V angles $\Theta_{DR1}$ and $\Theta_{DR2}$ change in the drive pulley 11, and a boundary BL between the inner peripheral portion 124 and the outer peripheral portion 125 where the pulley-groove V angles $\Theta_{DN1}$ and $\Theta_{DN2}$ change in the driven pulley 12. When the double cogged V-belt 13 is bent at the curvature corresponding to the wrapping diameter of the double cogged V-belt 13 with respect to the drive pulley 11 and the driven pulley 12 in the medium-speed layout, the double cogged V-belt 13 has an average belt V angle smaller than the average belt V angle $\theta_0$ in a state that the double cogged V-belt 13 is extended straightly.

Figure 2A:
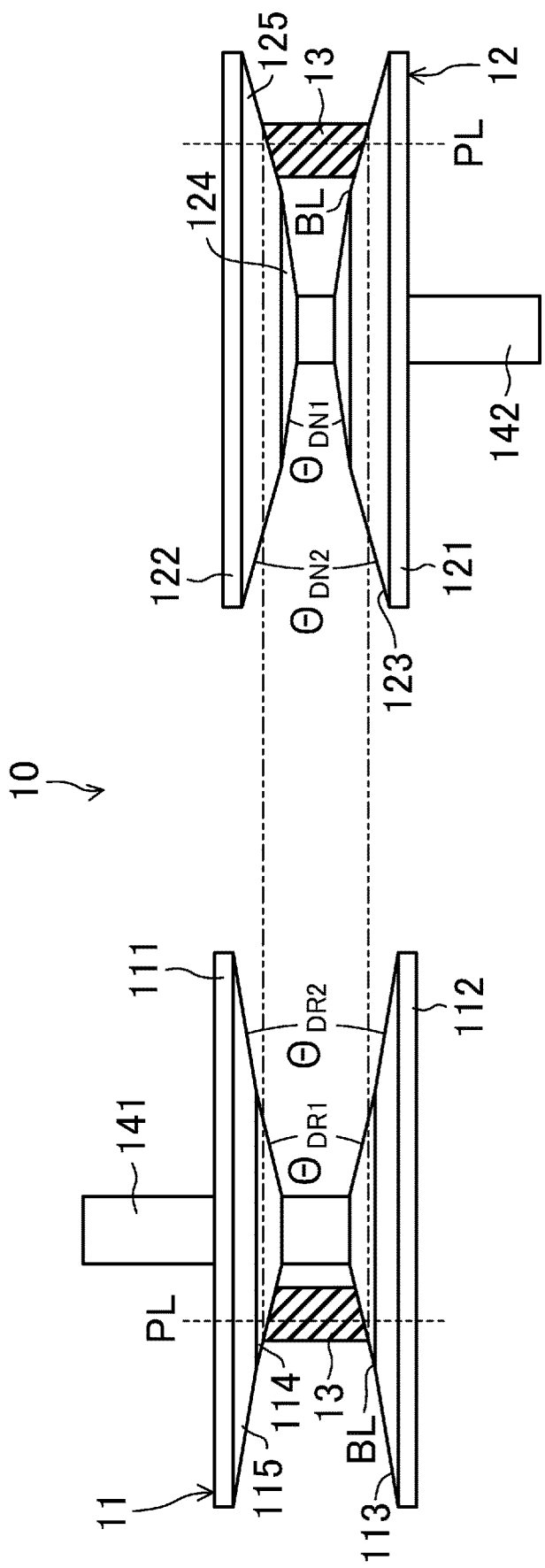
FIG. 2A is a plan view illustrating a low-speed layout of the belt-type transmission according to the embodiment.

When the movable sheave 112 of the drive pulley 11 in the medium-speed layout is moved in the direction away from the fixed sheave 111 by the interlocking mechanism, the movable sheave 122 of the driven pulley 12 interlocks with the movable sheave 112 and is moved in the direction toward the fixed sheave 121. In this case, as illustrated in FIG. 2A and FIG. 2B, the distance between the fixed sheave 111 and the movable sheave 112 of the drive pulley 11 becomes large, and the double cogged V-belt 13 is shifted to the inner periphery side of the pulley groove 113 in the pulley groove 113 and hence, the wrapping diameter of the double cogged V-belt 13 with respect to the drive pulley 11 becomes small. Furthermore, the distance between the fixed sheave 121 and the movable sheave 122 of the driven pulley 12 becomes small, the double cogged V-belt 13 is shifted to the outer periphery side of the pulley groove 123 in the pulley groove 123 and hence, the wrapping diameter of the double cogged V-belt 13 with respect to the driven pulley 12 becomes large.

That is, the operation above completes the low-speed layout in which the wrapping diameter of the double cogged V-belt 13 with respect to the drive pulley 11 is smaller than the wrapping diameter of the double cogged V-belt 13 with respect to the driven pulley 12.

Figure 5A:
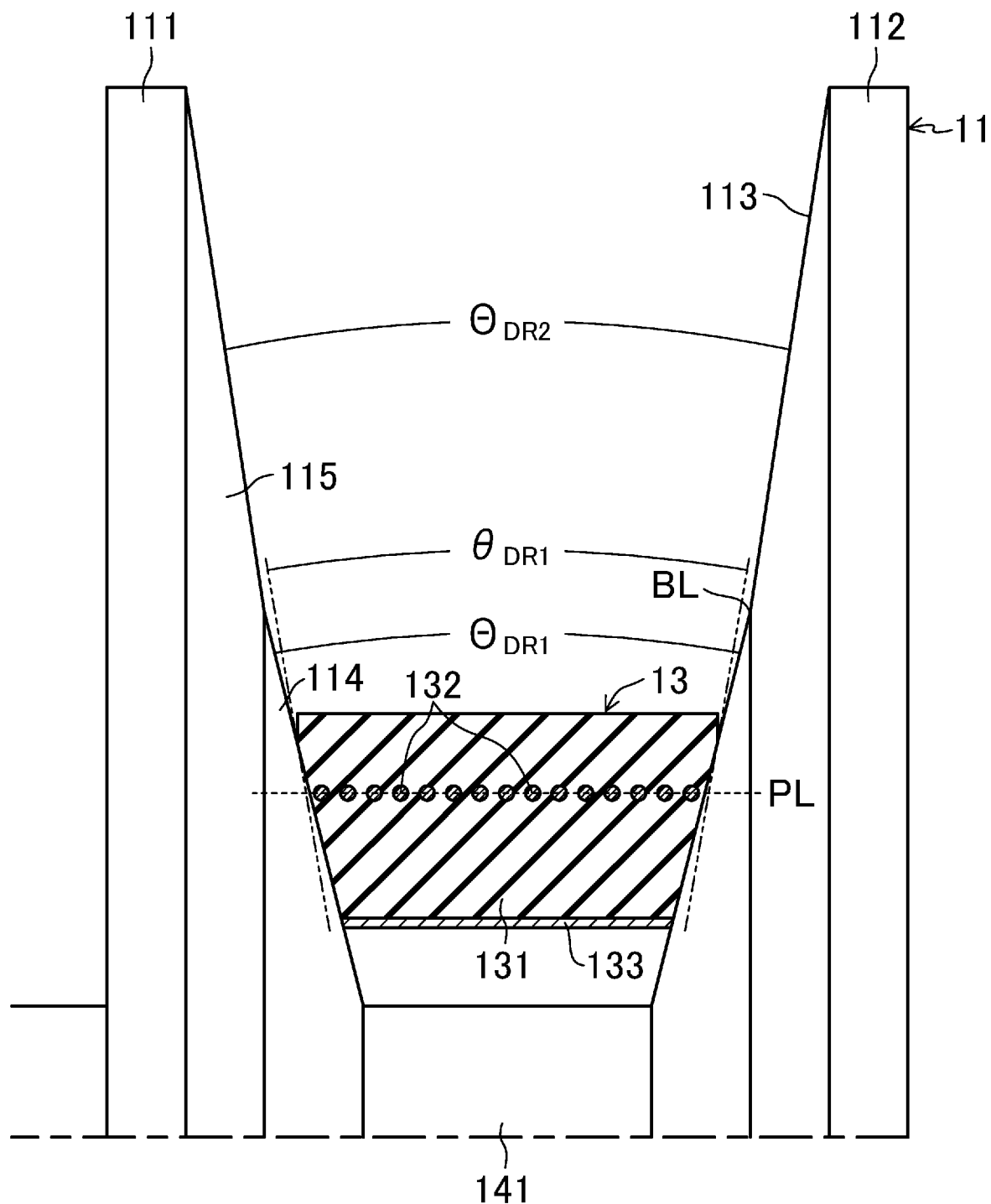
FIG. 5A is a view illustrating a state where the double cogged V-belt is wrapped around the drive pulley in the low-speed layout.

In the low-speed layout, as illustrated in FIG. 5A, the double cogged V-belt 13 is wrapped around the inner peripheral portion 114 having the pulley-groove V angle $\Theta_{DR1}$ in the drive pulley 11. Furthermore, when the double cogged V-belt 13 is bent at a curvature corresponding to the wrapping diameter of the double cogged V-belt 13 with respect to the drive pulley 11 in a predetermined low-speed layout, the double cogged V-belt 13 has an average belt V angle $\theta_{DR1}$ smaller than the average belt V angle in the medium-speed layout. In addition, in the belt-type transmission 10 according to the embodiment, the pulley-groove V angle $\Theta_{DR1}$ of the inner peripheral portion 114 of the drive pulley 11 where the double cogged V-belt 13 is wrapped is larger than the average belt V angle $\theta_{DR1}$ in the predetermined low-speed layout. The difference between the pulley-groove V angle $\Theta_{DR1}$ and the average belt V angle $\theta_{DR1}$ ($\Theta_{DR1}-\theta_{DR1}$) is, from the viewpoint of obtaining the excellent durability of the double cogged V-belt 13, suitably in the range from 0.6° to 3.3°, and more suitably in the range from 1.0° to 2.8°.

Figure 5B:
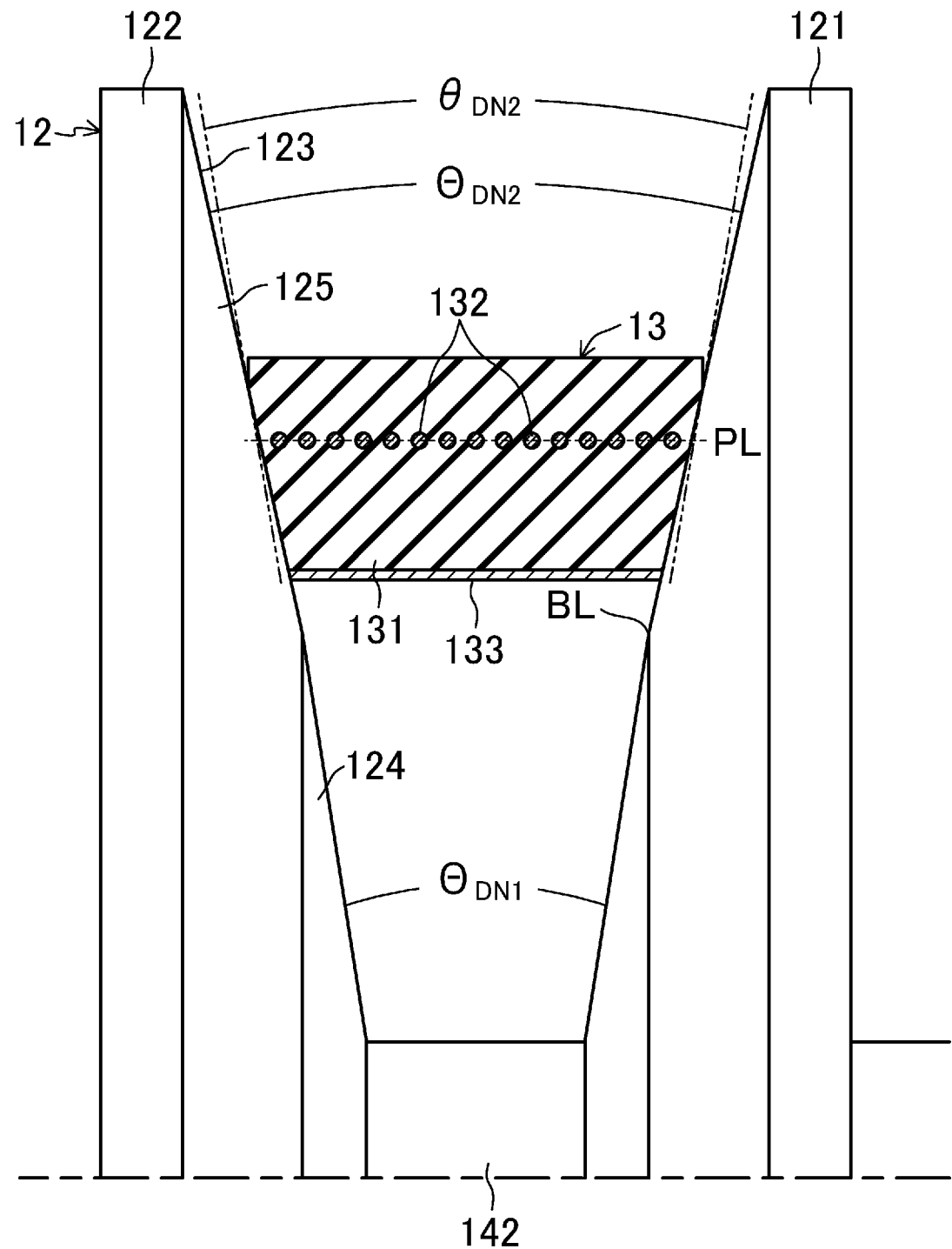
FIG. 5B is a view illustrating a state where the double cogged V-belt is wrapped around the driven pulley in the low-speed layout.

In the low-speed layout, as illustrated in FIG. 5B, the double cogged V-belt 13 is wrapped around the outer peripheral portion 125 having the pulley-groove V angle $\Theta_{DN2}$ in the driven pulley 12. Furthermore, when the double cogged V-belt 13 is bent at a curvature corresponding to the wrapping diameter of the double cogged V-belt 13 with respect to the driven pulley 12 in the predetermined low-speed layout, the double cogged V-belt 13 has an average belt V angle $\theta_{DN2}$ larger than the average belt V angle in the medium-speed layout. In addition, in the belt-type transmission 10 according to the embodiment, the pulley-groove V angle $\Theta_{DN2}$ of the outer peripheral portion 125 of the driven pulley 12 where the double cogged V-belt 13 is wrapped is larger than the average belt V angle $\theta_{DN2}$ in the predetermined low-speed layout. The difference between the pulley-groove V angle $\Theta_{DN2}$ and the average belt V angle $\theta_{DN2}$ ($\Theta_{DN2}-\theta_{DN2}$) is, from the viewpoint of obtaining the excellent durability of the double cogged V-belt 13, suitably in the range from 0.3° to 3.0°, and more suitably in the range from 0.7° to 2.5°.

Here, in the low-speed layout, the double cogged V-belt 13 is arranged such that, due to the elastic deformation of the V-belt body 131, the whole areas of the respective inclined faces 131a located on both sides of the V-belt body 131 are brought into contact with both side faces of the pulley groove 113 of the drive pulley 11 and both side faces of the pulley groove 123 of the driven pulley 12. Consequently, as for the inclined face 131a located on each of both sides of the double cogged V-belt 13, the contact pressure of the inclined face 131a that is brought into contact with the drive pulley 11 and the driven pulley 12 becomes relatively high on the inner periphery side of the inclined face 131a and, on the other hand, the contact pressure of the inclined face 131a that is brought into contact with the drive pulley 11 and the driven pulley 12 becomes relatively low on the outer periphery side of the inclined face 131a.

When the movable sheave 112 of the drive pulley 11 in the medium-speed layout is moved in the direction toward the fixed sheave 111 by the interlocking mechanism, the movable sheave 122 of the driven pulley 12 interlocks with the movable sheave 112 and is moved in the direction away from the fixed sheave 121. In this case, as illustrated in FIG.

3A and FIG. 3B, the distance between the fixed sheave 111 and the movable sheave 112 of the drive pulley 11 becomes small, the double cogged V-belt 13 is shifted to the outer periphery side of the pulley groove 113 in the pulley groove 113 and hence, the wrapping diameter of the double cogged V-belt 13 with respect to the drive pulley 11 becomes large. Furthermore, the distance between the fixed sheave 121 and the movable sheave 122 of the driven pulley 12 becomes large, the double cogged V-belt 13 is shifted to the inner periphery side of the pulley groove 123 in the pulley groove 123 and hence, the wrapping diameter of the double cogged V-belt 13 with respect to the driven pulley 12 becomes small. That is, the operation above completes the high-speed layout in which the wrapping diameter of the double cogged V-belt 13 with respect to the drive pulley 11 is larger than the wrapping diameter of the double cogged V-belt 13 with respect to the driven pulley 12.

Figure 6A:
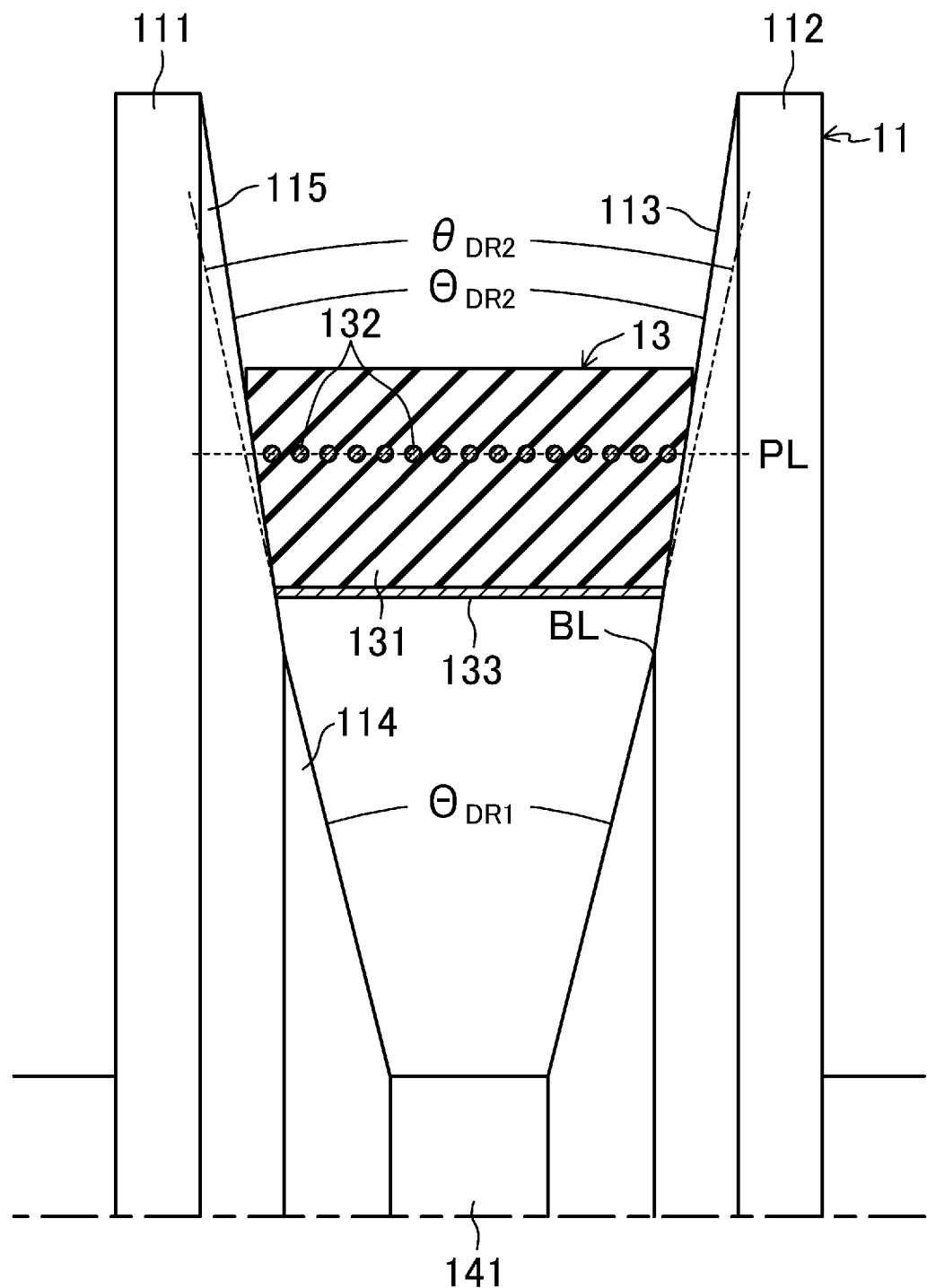
FIG. 6A is a view illustrating a state where the double cogged V-belt is wrapped around the drive pulley in the high-speed layout.

In the high-speed layout, as illustrated in FIG. 6A, the double cogged V-belt 13 is wrapped around the outer peripheral portion 115 having the pulley-groove V angle $\Theta_{DR2}$ in the drive pulley 11. Furthermore, when the double cogged V-belt 13 is bent at a curvature corresponding to the wrapping diameter of the double cogged V-belt 13 with respect to the drive pulley 11 in a predetermined high-speed layout, the double cogged V-belt 13 has an average belt V angle $\theta_{DR2}$ larger than the average belt V angle in the medium-speed layout. In addition, in the belt-type transmission 10 according to the embodiment, the pulley-groove V angle $\Theta_{DR2}$ of the outer peripheral portion 115 of the drive pulley 11 around which the double cogged V-belt 13 is wrapped is smaller than the average belt V angle $\theta_{DR2}$ in the predetermined high-speed layout. The differences between the average belt V angle $\theta_{DR2}$ and the pulley-groove V angle $\Theta_{DR2}$ ($\theta_{DR2}-\Theta_{DR2}$) is, from the viewpoint of obtaining the excellent durability of the double cogged V-belt 13, suitably in the range from 0.3° to 3.0°, and more suitably in the range from 0.7° to 2.5°.

Figure 6B:
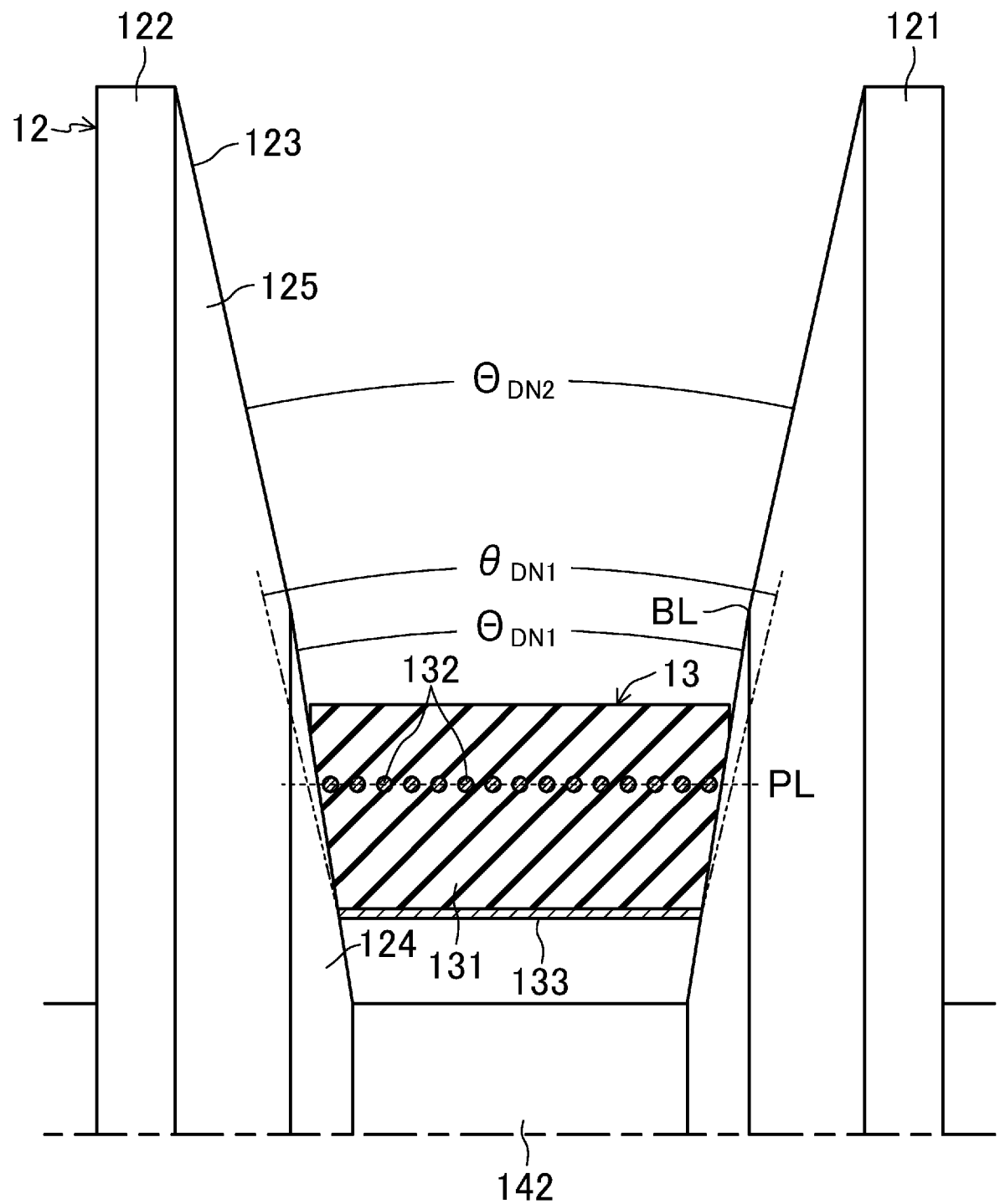
FIG. 6B is a view illustrating a state where the double cogged V-belt is wrapped around the driven pulley in the high-speed layout.

In the high-speed layout, as illustrated in FIG. 6B, the double cogged V-belt 13 is wrapped around the inner peripheral portion 124 having the pulley-groove V angle $\Theta_{DN1}$ in the driven pulley 12. Furthermore, when the double cogged V-belt 13 is bent at a curvature corresponding to the wrapping diameter of the double cogged V-belt 13 with respect to the driven pulley 12 in the predetermined high-speed layout, the double cogged V-belt 13 has an average belt V angle $\theta_{DN1}$ smaller than the average belt V angle in the medium-speed layout. In addition, in the belt-type transmission 10 according to the embodiment, the pulley-groove V angle $\Theta_{DN1}$ of the inner peripheral portion 124 of the driven pulley 12 where the double cogged V-belt 13 is wrapped is smaller than the average belt V angle $\theta_{DN1}$ in the predetermined high-speed layout. The differences between the average belt V angle $\theta_{DN1}$ and the pulley-groove V angle $\Theta_{DN1}$ ($\theta_{DN1}-\Theta_{DN1}$) is, from the viewpoint of obtaining the excellent durability of the double cogged V-belt 13, suitably in the range from 0.6° to 3.3°, and more suitably in the range from 1.0° to 2.8°.

Here, in the high-speed layout, due to the elastic deformation of the V-belt body 131, the whole areas of the respective inclined faces 131a located on both sides of the double cogged V-belt 13 are brought into contact with the respective faces of both sides of the pulley groove 113 of the drive pulley 11 and the respective faces of both sides of the pulley groove 123 of the driven pulley 12. Consequently, as for the inclined face 131a located on each of both sides of the double cogged V-belt 13, the contact pressure of the inclined face 131a that is brought into contact with the drive pulley 11 and the driven pulley 12 becomes relatively low on the inner periphery side of the inclined face 131a, and the contact pressure of the inclined face 131a that is brought into contact with the drive pulley 11 and the driven pulley 12 becomes relatively high on the outer periphery side of the inclined face 131a.

As for the belt-type transmission 10 according to the embodiment constituted as above, in the entire range of the low-speed layout, the pulley-groove V angle $\Theta_{DR1}$ of the inner peripheral portion 114 of the drive pulley 11 where the double cogged V-belt 13 is wrapped is larger than the average belt V angle $\theta_{DR1}$ when the double cogged V-belt 13 is bent at the curvature corresponding to the wrapping diameter of the double cogged V-belt 13 with respect to the drive pulley 11, and the pulley-groove V angle $\Theta_{DN2}$ of the outer peripheral portion 125 of the driven pulley 12 where the double cogged V-belt 13 is wrapped is larger than the average belt V angle $\theta_{DN2}$ when the double cogged V-belt 13 is bent at the curvature corresponding to the wrapping diameter of the double cogged V-belt 13 with respect to the driven pulley 12 thus obtaining the excellent durability of the double cogged V-belt 13. This result may be brought about by the following reasons.

In the low-speed layout, although comparatively high contact pressure acts on the inclined face 131a of each of both sides of the double cogged V-belt 13 in the drive pulley 11, the pulley-groove V angle $\Theta_{DR1}$ of the inner peripheral portion 114 of the drive pulley 11 where the double cogged V-belt 13 is wrapped is larger than the average belt V angle $\theta_{DR1}$ when the double cogged V-belt 13 is bent at the curvature corresponding to the wrapping diameter of the double cogged V-belt 13 with respect to the drive pulley 11 and hence, as for the inclined face 131a located on each of both sides of the double cogged V-belt 13, the contact pressure of the inclined face 131a that is brought into contact with the drive pulley 11 becomes relatively high on the inner periphery side of the inclined face 131a and, on the other hand, the contact pressure of the inclined face 131a that is brought into contact with the drive pulley 11 becomes relatively low on the outer periphery side of the inclined face 131a. As a result, it is estimated that the outer periphery side of the double cogged V-belt 13 is prevented from buckling due to the compression of the double cogged V-belt 13 in the belt width direction in the pulley groove 113 of the drive pulley 11, and a shearing force that acts on the interface between the cord 132 and the V-belt body 131 is lowered thus reducing the risk of the separation of the cord 132 from the V-belt body 131.

Furthermore, in the low-speed layout, although in the driven pulley 12, comparatively high torque acts on the double cogged V-belt 13, and a shearing force attributed to the action above acts on the inclined face 131a of each of both sides of the double cogged V-belt 13, the pulley-groove V angle $\Theta_{DN2}$ of the outer peripheral portion 125 of the driven pulley 12 where the double cogged V-belt 13 is wrapped is larger than the average belt V angle $\theta_{DN2}$ when the double cogged V-belt 13 is bent at the curvature corresponding to the wrapping diameter of the double cogged V-belt 13 with respect to the driven pulley 12 and hence, as for the inclined face 131a of each of both sides of the double cogged V-belt 13, the shearing force becomes relatively high on the inner periphery side of the inclined face 131a and, on the other hand, the shearing force becomes relatively low on the outer periphery side of the inclined face 131a. As a result, it is estimated that the shearing force that acts on the cord 132 exposed to the outer periphery side of the inclined face 131a of each of both sides of the double cogged V-belt 13 is lowered thus reducing the risk of peeling-off and popout of the cord 132 from the V-belt body 131.

In addition, in the belt-type transmission 10 according to the embodiment, in the entire range of the high-speed layout, the pulley-groove V angle $\Theta_{DR2}$ of the outer peripheral portion 115 of the drive pulley 11 where the double cogged V-belt 13 is wrapped is smaller than the average belt V angle $\theta_{DR2}$ when the double cogged V-belt 13 is bent at the curvature corresponding to the wrapping diameter of the double cogged V-belt 13 with respect to the drive pulley 11, and the pulley-groove V angle $\Theta_{DN1}$ of the inner peripheral portion 124 of the driven pulley 12 where the double cogged V-belt 13 is wrapped is smaller than average belt V angle $\theta_{DN1}$ when the double cogged V-belt 13 is bent at the curvature corresponding to the wrapping diameter of the double cogged V-belt 13 with respect to the driven pulley 12 thus obtaining the excellent durability of the double cogged V-belt 13. This result may be brought about by the following reasons.

In the high-speed layout, the double cogged V-belt 13 travels at high speed. In the double cogged V-belt 13 that travels at high speed, although in the span portions between the drive pulley 11 and the driven pulley 12, the speeds of various portions of the double cogged V-belt 13 in the belt thickness direction are equal to each other, and in the respective portions of the double cogged V-belt 13 wrapped around the drive pulley 11 and the driven pulley 12, a speed of the double cogged V-belt 13 at the center position PL of the cord 132 in the belt thickness direction is maintained equal to the speed of the double cogged V-belt 13 in the span portions between the drive pulley 11 and the driven pulley 12, and the speed of the double cogged V-belt 13 lowers in the direction away from the center position PL and toward the inner periphery side of the double cogged V-belt 13, and increases in the direction away from the center position PL and toward the outer periphery side of the double cogged V-belt 13. That is, while the double cogged V-belt 13 is shifted to the inner periphery side or to the outer periphery side in each of the drive pulley 11 and the driven pulley 12, the speed of the double cogged V-belt 13 is repeatedly changed on the inner periphery side or the outer periphery side with respect to the center position PL of the cord 132 in the belt thickness direction. In this case, the compression rubber layer 1311 located on the inner periphery side with respect to the center position PL of the cord 132 in the belt thickness direction receives a contact pressure on the side face thereof that constitutes the greater part of the inclined face 131a located on each of both sides of the pulley contact face, from each of the drive pulley 11 and the driven pulley 12, so as to be restrained by the drive pulley 11 and the driven pulley 12 and, in particular, the lower cog 135 constituted of the compression rubber layer 1311 is oscillated at high frequency in the belt length direction.

However, the pulley-groove V angle $\Theta_{DR2}$ of the outer peripheral portion 115 of the drive pulley 11 where the double cogged V-belt 13 is wrapped is smaller than the average belt V angle $\theta_{DR2}$ when the double cogged V-belt 13 is bent at the curvature corresponding to the wrapping diameter of the double cogged V-belt 13 with respect to the drive pulley 11, and the pulley-groove V angle $\Theta_{DN1}$ of the inner peripheral portion 124 of the driven pulley 12 where the double cogged V-belt 13 is wrapped is smaller than the average belt V angle $\theta_{DN1}$ when the double cogged V-belt 13 is bent at the curvature corresponding to the wrapping diameter of the double cogged V-belt 13 with respect to the driven pulley 12 and hence, as for the inclined face 131a located on each of both sides of the double cogged V-belt 13, the contact pressure of the inclined face 131a that is brought into contact with the drive pulley 11 becomes relatively low on the inner periphery side of the inclined face 131a and, on the other hand, the contact pressure of the inclined face 131a that is brought into contact with the drive pulley 11 becomes relatively high on the outer periphery side of the inclined face 131a. As a result, it is estimated that the compression rubber layer 1311 is restrained relatively loosely from each of the drive pulley 11 and the driven pulley 12 thus preventing the lower cog 135 from being oscillated at high frequency in the belt length direction of the double cogged V-belt 13.

Here, in the embodiment mentioned above, although in the high-speed layout, the pulley-groove V angle $\Theta_{DR2}$ of the outer peripheral portion 115 of the drive pulley 11 where the double cogged V-belt 13 is wrapped is smaller than the average belt V angle $\theta_{DR2}$, the present technique is not particularly limited to the constitution above, and the pulley-groove V angle $\Theta_{DR2}$ may be equal to or larger than the average belt V angle $\theta_{DR2}$.

In the embodiment mentioned above, the center position PL of the cord 132 in the belt thickness direction of the double cogged V-belt 13 is, in the medium-speed layout, located on the boundary BL between the inner peripheral portion 114 and the outer peripheral portion 115 where the pulley-groove V angles $\Theta_{DR1}$ and $\Theta_{DR2}$ change in the drive pulley 11, and the boundary BL between the inner peripheral portion 124 and the outer peripheral portion 125 where the pulley-groove V angles $\Theta_{DN1}$ and $\Theta_{DN2}$ change in the driven pulley 12. Consequently, in the entire range of the low-speed layout, the pulley-groove V angle $\Theta_{DR1}$ is larger than the average belt V angle $\theta_{DR1}$, and the pulley-groove V angle $\Theta_{DN2}$ is larger than average belt V angle $\theta_{DN2}$. Furthermore, in the entire range of the high-speed layout, the pulley-groove V angle $\Theta_{DR2}$ is smaller than average belt V angle $\theta_{DR2}$, and the pulley-groove V angle $\Theta_{DN1}$ is smaller than the average belt V angle $\theta_{DN1}$. However, the present technique is not particularly limited to the constitution above.

For example, in the medium-speed layout, the center position PL of the cord 132 in the belt thickness direction of the double cogged V-belt 13 is located on the outer peripheral portion 115 of the drive pulley 11, and the inner peripheral portion 124 of the driven pulley 12 and hence, it may be possible to adopt the constitution in which in at least a certain range of the low-speed layout, the pulley-groove V angle $\Theta_{DR1}$ is larger than the average belt V angle $\theta_{DR1}$, and the pulley-groove V angle $\Theta_{DN2}$ is larger than the average belt V angle $\theta_{DN2}$. Furthermore, in the medium-speed layout, the center position PL of the cord 132 in the belt thickness direction of the double cogged V-belt 13 is located on the inner peripheral portion 114 of the drive pulley 11, and the outer peripheral portion 125 of the driven pulley 12 and hence, it may be possible to adopt the constitution in which in at least a certain range of the high-speed layout, the pulley-groove V angle $\Theta_{DR2}$ is smaller than the average belt V angle $\theta_{DR2}$, and the pulley-groove V angle $\Theta_{DN1}$ is smaller than the average belt V angle $\theta_{DN1}$.

Although in the embodiment mentioned above, the double cogged V-belt 13 is adopted, the present technique is not particularly limited to this example, a single cogged V-belt having only lower cogs may be adopted, and a raw edge V-belt or a wrapped V-belt that have no cog may also be adopted.

Example (Belt-Type Transmission)

Belt-type transmissions for the respective tests of the following example and comparative examples 1 to 3 were prepared. Here, the respective constitutions of the tests are also illustrated in Table 1.

Example

Each of the belt-type transmissions for the respective tests has the constitution similar to the case of the embodiment mentioned above, and the constitution of the belt-type transmission applied to the example was as follows; that is, the pulley-groove V angle $\Theta_{DR1}$ of the inner peripheral portion of the drive pulley is 26.5°, the pulley-groove V angle $\Theta_{DR2}$ of the outer peripheral portion of the drive pulley is 26.0°, the pulley-groove V angle $\Theta_{DN1}$ of the inner peripheral portion of the driven pulley is 26.0°, the pulley-groove V angle $\Theta_{DN2}$ of the outer peripheral portion of the driven pulley is 29.5°, and the double cogged V-belt in which the belt circumferential length at the center position of the cord in the belt thickness direction is 1200 mm, and the belt width is 30 mm is extended between and wrapped around the drive pulley and the driven pulley.

As for the belt-type transmission for the example, in a lowest speed layout in which the speed of the belt-type transmission is lowest in the low-speed layout, the wrapping diameter of the double cogged V-belt with respect to the drive pulley is set to a minimum of 80 mm, and the wrapping diameter of the double cogged V-belt with respect to the driven pulley is set to a maximum of 230 mm. Furthermore, in the lowest speed layout, the average belt V angle $\theta_{DR1}$ in the drive pulley is 25.4°, and the average belt V angle $\theta_{DN2}$ in the driven pulley is 28.4°. Consequently, the pulley-groove V angle $\Theta_{DR1}$ of 26.5° is larger than the average belt V angle $\theta_{DR1}$ of 25.4°, and the pulley-groove V angle $\Theta_{DN2}$ of 29.5° is larger than the average belt V angle $\theta_{DN2}$ of 28.4°.

In the highest speed layout in which the speed of the belt-type transmission is highest in the high-speed layout, the wrapping diameter of the double cogged V-belt with respect to the drive pulley is set to a maximum of 200 mm, and the wrapping diameter of the double cogged V-belt with respect to the driven pulley is set to a minimum of 160 mm. Furthermore, in the highest speed layout, the average belt V angle $\theta_{DR2}$ in the drive pulley is 27.8°, and the average belt V angle $\theta_{DN1}$ in the driven pulley is 27.0°. Consequently, the pulley-groove V angle $\Theta_{DR2}$ of 26.0° is smaller than the average belt V angle $\theta_{DR2}$ of 27.8°, and the pulley-groove V angle $\Theta_{DN1}$ of 26.0° is smaller than the average belt V angle $\theta_{DN1}$ of 27.0°.

First Comparative Example

The belt-type transmission for the test having the constitution similar to the case of the example mentioned above except for the following constitution was applied to the first comparative example; that is, the pulley-groove V angle $\Theta_{DR1}$ of the inner peripheral portion of the drive pulley is 25.4°, the pulley-groove V angle $\Theta_{DR2}$ of the outer peripheral portion of the drive pulley is 25.4°, the pulley-groove V angle $\Theta_{DN1}$ of the inner peripheral portion of the driven pulley is 25.4°, and the pulley-groove V angle $\Theta_{DN2}$ of the outer peripheral portion of the driven pulley is 25.4°.

In the comparative example 1, the pulley-groove V angle $\Theta_{DR1}$ of 25.4° is equal to the average belt V angle $\theta_{DR1}$ of 25.4°, and the pulley-groove V angle $\Theta_{DN2}$ of 25.4° is smaller than the average belt V angle $\theta_{DN2}$ of 28.4°. Furthermore, the pulley-groove V angle $\Theta_{DR2}$ of 25.4° is smaller than the average belt V angle $\theta_{DR2}$ of 27.8°, and the pulley-groove V angle $\Theta_{DN1}$ of 25.4° is smaller than the average belt V angle $\theta_{DN1}$ of 27.0°.

Second Comparative Example

The belt-type transmission for the test having the constitution similar to the case of the example mentioned above except for the following constitution was applied to the second comparative example; that is, the pulley-groove V angle $\Theta_{DR1}$ of the inner peripheral portion of the drive pulley is 27.0°, the pulley-groove V angle $\Theta_{DR2}$ of the outer peripheral portion of the drive pulley is 27.0°, the pulley-groove V angle $\Theta_{DN1}$ of the inner peripheral portion of the driven pulley is 27.0°, and the pulley-groove V angle $\Theta_{DN2}$ of the outer peripheral portion of the driven pulley is 27.0°.

In the second comparative example, the pulley-groove V angle $\Theta_{DR1}$ of 27.0° is larger than the average belt V angle $\theta_{DR1}$ of 25.4°, and the pulley-groove V angle $\Theta_{DN2}$ of 27.0° is smaller than the average belt V angle $\theta_{DN2}$ of 28.4°. Furthermore, the pulley-groove V angle $\Theta_{DR2}$ of 27.0° is smaller than the average belt V angle $\theta_{DR2}$ of 27.8°, and the pulley-groove V angle $\Theta_{DN1}$ of 27.0° is equal to the average belt V angle $\theta_{DN1}$ of 27.0°.

Third Comparative Example

The belt-type transmission for the test having the constitution similar to the case of the example mentioned above except for the following constitution was applied to the third comparative example; that is, the pulley-groove V angle $\Theta_{DR1}$ of the inner peripheral portion of the drive pulley is 24.4°, the pulley-groove V angle $\Theta_{DR2}$ of the outer peripheral portion of the drive pulley is 28.8°, the pulley-groove V angle $\Theta_{DN1}$ of the inner peripheral portion of the driven pulley is 28.0°, and the pulley-groove V angle $\Theta_{DN2}$ of the outer peripheral portion of the driven pulley is 27.4°.

In the third comparative example, the pulley-groove V angle $\Theta_{DR1}$ of 24.4° is smaller than the average belt V angle $\theta_{DR1}$ of 25.4°, and the pulley-groove V angle $\Theta_{DN2}$ of 27.4° is smaller than the average belt V angle $\theta_{DN2}$ of 28.4°. Furthermore, the pulley-groove V angle $\Theta_{DR2}$ of 28.8° is larger than the average belt V angle $\theta_{DR2}$ of 27.8°, and the pulley-groove V angle $\Theta_{DN1}$ of 28.0° is larger than the average belt V angle $\theta_{DN1}$ of 27.0°.

TABLE 1

| | | | | Example | First Comparative Example | Second Comparative Example | Third Comparative Example |
|---|---|---|---|---|---|---|---|
| Lowest Speed Layout | Drive Pulley | Inner | Pulley-groove V angle $\Theta_{DR1}$ (deg) | 26.5 | 25.4 | 27.0 | 24.4 |
| | | | Average belt V angle $\theta_{DR1}$ (deg) | 25.4 | 25.4 | 25.4 | 25.4 |
| | | | $\Theta_{DR1} - \theta_{DR1}$ (deg) | 1.1 | 1 | 1.6 | −1.0 |

TABLE 1-continued

|  |  |  |  | Example | First Comparative Example | Second Comparative Example | Third Comparative Example |
|---|---|---|---|---|---|---|---|
|  | Driven Pulley | Outer | Pulley-groove V angle $\Theta_{DN2}$ (deg) | 29.5 | 25.4 | 27.0 | 27.4 |
|  |  |  | Average belt V angle $\theta_{DN2}$ (deg) | 28.4 | 28.4 | 28.4 | 28.4 |
|  |  |  | $\Theta_{DN2} - \theta_{DN2}$ (deg) | 1.1 | -3.0 | -1.4 | -1.0 |
|  | Belt travelling life (hr) |  |  | 35 | 2 | 1 | 0.5 |
| Highest Speed Layout | Drive Pulley | Outer | Pulley groove V angle $\Theta_{DR2}$ (deg) | 26.0 | 25.4 | 27.0 | 28.8 |
|  |  |  | Average belt V angle $\theta_{DR2}$ (deg) | 27.8 | 27.8 | 27.8 | 27.8 |
|  |  |  | $\Theta_{DR2} - \theta_{DR2}$ (deg) | 1.8 | 2.4 | 0.8 | -1.0 |
|  | Driven Pulley | Inner | Pulley-groove V angle $\Theta_{DN1}$ (deg) | 26.0 | 25.4 | 27.0 | 28.0 |
|  |  |  | Average belt V angle $\theta_{DN1}$ (deg) | 27.0 | 27.0 | 27.0 | 27.0 |
|  |  |  | $\theta_{DN1} - \Theta_{DR1}$ (deg) | 1.0 | 1.6 | 1 | -1.0 |
|  | Belt travelling life (hr) |  |  | 90 | 95 | 30 | 10 |

(Test Method)

As for the belt-type transmission for the test applied to each of the example, and the first, second, and third comparative examples, in the lowest speed layout under an ambient temperature of 100° C., an axle load of 2000 N was applied to the driven shaft in the direction away from the drive shaft, and the drive pulley was rotated at a rotating speed of 8000 rpm while a rotation torque of 70 N·m was applied to the drive pulley, thereby running the double cogged V-belt. A travelling time until the double cogged V-belt is damaged (when the cord popped out) was then measured as a belt travelling life.

As for the belt-type transmission for the test applied to each of the example, and the first, second, and third comparative examples, in the highest speed layout under an ambient temperature of 100° C., an axle load of 2500 N was applied to the driven shaft in the direction away from the drive shaft, and the drive pulley was rotated at a rotating speed of 9800 rpm while a rotation torque of 80 N·m was applied to the drive pulley, thereby running the double cogged V-belt. A travelling time until the double cogged V-belt is damaged (when the lower cog was broken) was then measured as a belt travelling life.

(Test Results)

Table 1 shows the test results. As can be understood from Table 1, the example; that is, the pulley-groove V angle $\Theta_{DR1}$ of the inner peripheral portion of the drive pulley is larger than the average belt V angle $\theta_{DR1}$ and the pulley-groove V angle $\Theta_{DN2}$ of the outer peripheral portion of the driven pulley is larger than the average belt V angle $\theta_{DN2}$, exhibits excellent durability of the double cogged V-belt in the lowest speed layout compared to the first, second, and third comparative examples.

Furthermore, as can be understood from Table 1, the example and the first comparative example; that is, the pulley-groove V angle $\Theta_{DR2}$ of the outer peripheral portion of the drive pulley is smaller than the average belt V angle $\theta_{DR2}$ and the pulley-groove V angle $\Theta_{DN1}$ of the inner peripheral portion of the driven pulley is smaller than the average belt V angle $\theta_{DN1}$, exhibits excellent durability of the double cogged V-belt in the highest speed layout compared to the second and third comparative examples.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines.

What is claimed is:

1. A belt-type transmission including a drive pulley, a driven pulley, and a V-belt wrapped around the drive pulley and the driven pulley, the belt-type transmission being capable of changing a wrapping diameter of the V-belt with respect to the drive pulley and the driven pulley, wherein
in at least a certain range of a low-speed layout where the wrapping diameter of the V-belt with respect to the drive pulley is smaller than the wrapping diameter of the V-belt with respect to the driven pulley, a pulley-groove V angle of a portion of the drive pulley where the V-belt is wrapped is larger than an average belt V angle when the V-belt is bent at a curvature corresponding to the wrapping diameter of the V-belt with respect to the drive pulley, and a pulley-groove V angle of a portion of the driven pulley where the V-belt is wrapped is larger than an average belt V angle when the V-belt is bent at a curvature corresponding to the wrapping diameter of the V-belt with respect to the driven pulley.

2. The belt-type transmission of claim 1, wherein
in the low-speed layout, the pulley-groove V angle of the portion of the driven pulley where the V-belt is wrapped is larger than or equal to the pulley-groove V angle of the portion of the drive pulley where the V-belt is wrapped.

3. The belt-type transmission of claim 1, wherein
in the low-speed layout, the pulley-groove V angle of the portion of the drive pulley where the V-belt is wrapped is in a range from 26.5° to 38.5°.

4. The belt-type transmission of claim 1, wherein
in the low-speed layout, the pulley-groove V angle of the portion of the driven pulley where the V-belt is wrapped is in a range from 29.5° to 41.5°.

5. The belt-type transmission of claim 1, wherein
in the low-speed layout, a difference between the pulley-groove V angle of the portion of the drive pulley where the V-belt is wrapped and the average belt V angle when the V-belt is bent at the curvature corresponding to the wrapping diameter of the V-belt with respect to the drive pulley is in the range from 0.6° to 3.3°.

6. The belt-type transmission of claim 1, wherein
in the low-speed layout, a difference between the pulley-groove V angle of the portion of the driven pulley where the V-belt is wrapped and the average belt V angle when the V-belt is bent at the curvature corresponding to the wrapping diameter of the V-belt with respect to the driven pulley is in the range from 0.3° to 3.0°.

7. The belt-type transmission of claim 1, wherein
in an entire range of the low-speed layout, the pulley-groove V angle of the portion of the drive pulley where the V-belt is wrapped is larger than the average belt V angle when the V-belt is bent at the curvature corresponding to the wrapping diameter of the V-belt with respect to the drive pulley, and the pulley-groove V angle of the portion of the driven pulley where the V-belt is wrapped is larger than the average belt V angle when the V-belt is bent at the curvature corresponding to the wrapping diameter of the V-belt with respect to the driven pulley.

8. The belt-type transmission of claim 1, wherein
in at least a certain range of a high-speed layout where the wrapping diameter of the V-belt with respect to the drive pulley is larger than the wrapping diameter of the V-belt with respect to the driven pulley, a pulley-groove V angle of a portion of the drive pulley where the V-belt is wrapped is smaller than an average belt V angle when the V-belt is bent at a curvature corresponding to the wrapping diameter of the V-belt with respect to the drive pulley, and a pulley-groove V angle of a portion of the driven pulley where the V-belt is wrapped is smaller than an average belt V angle when the V-belt is bent at a curvature corresponding to the wrapping diameter of the V-belt with respect to the driven pulley.

9. The belt-type transmission of claim 8, wherein
in the high-speed layout, the pulley-groove V angle of the portion of the driven pulley where the V-belt is wrapped is smaller than or equal to the pulley-groove V angle of the portion of the drive pulley where the V-belt is wrapped.

10. The belt-type transmission of claim 8, wherein
in the high-speed layout, the pulley-groove V angle of the portion of the drive pulley where the V-belt is wrapped is in a range from 26.0° to 38.0°.

11. The belt-type transmission of claim 8, wherein
in the high-speed layout, the pulley-groove V angle of the portion of the driven pulley where the V-belt is wrapped is in a range from 26.0° to 38.0°.

12. The belt-type transmission of claim 8, wherein
in the high-speed layout, a difference between the pulley-groove V angle of the portion of the drive pulley where the V-belt is wrapped and the average belt V angle when the V-belt is bent at the curvature corresponding to the wrapping diameter of the V-belt with respect to the drive pulley is in a range from 0.3° to 3.0°.

13. The belt-type transmission of claim 8, wherein
in the high-speed layout, a difference between the pulley-groove V angle of the portion of the driven pulley where the V-belt is wrapped and the average belt V angle when the V-belt is bent at the curvature corresponding to the wrapping diameter of the V-belt with respect to the driven pulley is in a range from 0.6° to 3.3°.

14. The belt-type transmission of claim 8, wherein
in an entire range of the high-speed layout, the pulley-groove V angle of the portion of the drive pulley where the V-belt is wrapped is smaller than the average belt V angle when the V-belt is bent at the curvature corresponding to the wrapping diameter of the V-belt with respect to the drive pulley, and the pulley-groove V angle of the portion of the driven pulley where the V-belt is wrapped is smaller than the average belt V angle when the V-belt is bent at the curvature corresponding to the wrapping diameter of the V-belt with respect to the driven pulley.

15. The belt-type transmission of claim 8, wherein
the V-belt includes a V-belt body made of rubber, and a cord embedded in the V-belt body to form a helical pattern having a pitch in a belt width direction, and
in a medium-speed layout where the wrapping diameter of the V-belt with respect to the drive pulley and the wrapping diameter of the V-belt with respect to the driven pulley are identical with each other, a center position of the cord in a belt thickness direction of the V-belt is located on a boundary where the pulley-groove V angle changes in the drive pulley and the driven pulley.

16. The belt-type transmission of claim 1, wherein
the V-belt is provided with lower cogs on an inner periphery side of the V-belt at fixed intervals.

* * * * *